(12) United States Patent
Trainer et al.

(10) Patent No.: US 12,027,940 B2
(45) Date of Patent: Jul. 2, 2024

(54) RECTIFIER

(71) Applicant: ROLLS-ROYCE plc, London (GB)

(72) Inventors: David R. Trainer, Derby (GB); Ellis F H Chong, Derby (GB); Jonathan M. Stevens, Derby (GB)

(73) Assignee: ROLLS-ROYCE PLC, London (GB)

(*) Notice: Subject to any disclaimer, the term of this patent is extended or adjusted under 35 U.S.C. 154(b) by 225 days.

(21) Appl. No.: 17/811,740

(22) Filed: Jul. 11, 2022

(65) Prior Publication Data
US 2023/0018916 A1    Jan. 19, 2023

(30) Foreign Application Priority Data

Jul. 16, 2021 (GB) .................................. 2110246

(51) Int. Cl.
| | |
|---|---|
| *H02K 47/04* | (2006.01) |
| *H02M 3/335* | (2006.01) |
| *H02M 7/219* | (2006.01) |
| *H02P 6/182* | (2016.01) |
| *H02P 101/30* | (2015.01) |

(52) U.S. Cl.
CPC ............ *H02K 47/04* (2013.01); *H02P 6/182* (2013.01); *H02M 3/33507* (2013.01); *H02M 7/219* (2013.01); *H02P 2101/30* (2015.01); *H02P 2209/07* (2013.01)

(58) Field of Classification Search
CPC ..... H02K 47/04; H02P 6/182; H02P 2209/07; H02M 7/219; H02M 1/14; H02M 1/12
See application file for complete search history.

(56) References Cited

U.S. PATENT DOCUMENTS

| | | | | |
|---|---|---|---|---|
| 5,124,904 A | * | 6/1992 | Paice | ...................... H02M 7/17 363/70 |
| 5,406,470 A | * | 4/1995 | Ridley | .................. H02M 3/285 363/69 |

(Continued)

FOREIGN PATENT DOCUMENTS

| | | |
|---|---|---|
| AT | 516643 A1 | 7/2016 |
| CN | 105981286 A | 9/2016 |

(Continued)

OTHER PUBLICATIONS

Feb. 9, 2024 Office Action issued in European Patent Application No. 22179422.5.

(Continued)

*Primary Examiner* — Pedro J Cuevas
(74) *Attorney, Agent, or Firm* — Oliff PLC

(57) ABSTRACT

An AC to DC conversion device has first and second AC input terminals arranged to be coupled respectively to first and second terminals of a phase of an AC current generator, an H-bridge rectification device comprising two pairs of diodes, each pair being coupled to a respective one of the AC terminals to produce a DC output comprising a rectified back EMF waveform, and a waveform generator. The waveform generator comprises an output coupled to the DC output of the H-bridge rectification device, and is configured to input a unidirectional waveform to the DC output having the same magnitude and fundamental frequency as the rectified back EMF, phase shifted by a predetermined angle relative to the rectified back EMF waveform.

20 Claims, 21 Drawing Sheets

(56) References Cited

U.S. PATENT DOCUMENTS

| | | | | |
|---|---|---|---|---|
| 6,501,192 B1* | 12/2002 | Lubomirsky | ........... | H02M 7/10 |
| | | | | 307/18 |
| 6,977,445 B2* | 12/2005 | Lubomirsky | ........... | H02M 7/08 |
| | | | | 307/18 |
| 7,157,807 B2* | 1/2007 | Lubomirsky | ......... | H02M 7/064 |
| | | | | 361/91.1 |
| 7,696,639 B2* | 4/2010 | Lubomirsky | ........... | H02M 7/08 |
| | | | | 307/18 |
| 8,837,176 B2 | 9/2014 | Trainer et al. | | |
| 9,837,943 B2* | 12/2017 | Oriol | ....................... | H02P 21/24 |
| 10,153,642 B2* | 12/2018 | Gomis | .................... | H02J 3/381 |
| 10,374,507 B2* | 8/2019 | Nikitin | .................. | H02M 7/217 |
| 10,608,565 B2 | 3/2020 | Singh et al. | | |
| 11,121,639 B2* | 9/2021 | Trainer | ................... | H02P 9/305 |
| 2003/0151935 A1* | 8/2003 | Lubomirsky | ......... | H02M 7/064 |
| | | | | 363/125 |
| 2006/0083035 A1* | 4/2006 | Lubomirsky | ......... | H02M 7/064 |
| | | | | 363/67 |
| 2015/0049530 A1* | 2/2015 | Trainer | ................ | H02M 7/797 |
| | | | | 363/123 |
| 2016/0315476 A1* | 10/2016 | Gomis | .................... | H02J 3/381 |
| 2016/0322924 A1* | 11/2016 | Oriol | ....................... | H02P 21/24 |
| 2018/0191237 A1* | 7/2018 | Nikitin | .................. | H02M 7/217 |
| 2019/0181786 A1 | 6/2019 | Singh et al. | | |
| 2020/0244181 A1* | 7/2020 | Trainer | ................. | H02M 7/219 |

FOREIGN PATENT DOCUMENTS

| | | | | | |
|---|---|---|---|---|---|
| EP | 1324481 | A2 | * | 7/2003 | ............ H02M 7/064 |
| EP | 2884614 | A1 | * | 6/2015 | .............. H02J 3/386 |
| EP | 2884657 | A1 | * | 6/2015 | .............. H02P 21/24 |
| EP | 3 442 104 | A1 | | 2/2019 | |
| EP | 3687054 | B1 | * | 9/2021 | ............. F01D 15/10 |
| EP | 3930161 | A1 | * | 12/2021 | ............. H02M 1/12 |
| EP | 4120532 | A1 | * | 1/2023 | ............. H02M 1/14 |
| WO | 2013178028 | A1 | | 12/2013 | |
| WO | WO-2015086801 | A1 | * | 6/2015 | .............. H02J 3/386 |

OTHER PUBLICATIONS

Trainer, D.R. et al., "B4-111 A New Hybrid Voltage-Sourced Converter for HVDC Power Transmission," Cigre Sessions, Aug. 23, 2010, XP008134692.

Nov. 29, 2022 extended Search Report issued in European Patent Application No. 22179422.5.

* cited by examiner

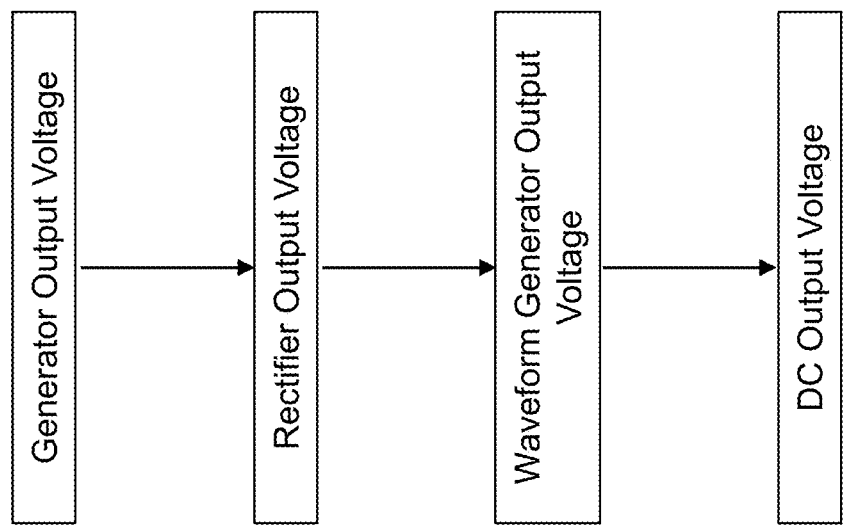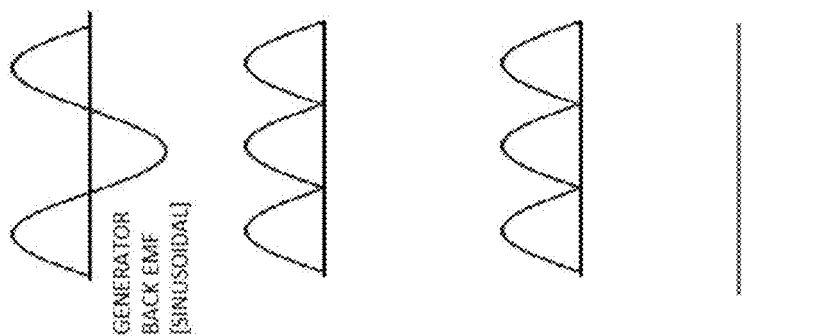
Figure 8

RECTIFIER

CROSS-REFERENCE TO RELATED APPLICATIONS

This application claims priority pursuant to 35 U.S.C. 119(a) to United Kingdom Patent Application No. 2110246.2, filed Jul. 16, 2021, which application is incorporated herein by reference in its entirety.

TECHNICAL FIELD

The present disclosure concerns a rectifier configured to convert Alternating Current (AC) electrical power to Direct Current (DC) electrical power.

BACKGROUND

Prior rectifiers are known, which convert AC power to DC power. Difficulties are frequently encountered when rectifying high or medium voltage supplies (of the order of 10 kilovolts (kV) or higher), due to the relatively low rating of conventional Insulated Gate Bipolar Transistors (IGBTs), which typically operate at between 3.3 kV and 4.5 kV. Such devices can be connected in series to provide the necessary voltage capacity, but simultaneous switching of such devices is problematic.

SUMMARY

In recent years, multi-level converters in the form of Neutral Point Clamped converters (NPCs) have been developed, which overcome the problem of switching multiple series connected IGBTs by switching them in sequence to provide a multi-level converter. Such devices are however still typically limited to around 3 kV DC. To achieve higher voltages, NPCs can be connected in series. Such devices are large and heavy. This can be disadvantageous in many applications, such as for use in ships and aircraft.

Furthermore, conventional rectifiers typically require high power active components and large capacitors in order to provide "clean" AC input and DC output power. Active components in traditional rectifiers typically result in high levels of switching loss, thereby reducing overall efficiency, and increasing device heat output, as well as weight and cost. Similarly, large capacity capacitors also lead to increased weight and cost and are prone to failure. The present invention seeks to provide a rectifier that addresses some or all of the above issues.

According to a first aspect there is provided an AC to DC conversion device comprising:
first and second AC input terminals arranged to be coupled respectively to first and second terminals of a phase of an AC current generator;
an H-bridge rectification device comprising two pairs of diodes, each pair being coupled to a respective one of the AC terminals to produce a DC output comprising a rectified back EMF waveform; and
a waveform generator comprising an output coupled to the DC output of the H-bridge rectification device, and configured to input a unidirectional waveform to the DC output, the unidirectional waveform having the same magnitude and fundamental frequency as the rectified back EMF waveform, phase shifted by a predetermined angle relative to the rectified back EMF waveform.

The predetermined angle may be determined in accordance with a required power in accordance with the equation:

$$P = \frac{EV\sin\delta}{XL}$$

where E is the back EMF of the AC input, V is the converter AC terminal voltage, XL is the machine inductive reactance, and δ is the phase shift. Consequently, by measuring E, V, and XL, a corresponding phase angle δ can be calculated for a given required power P.

Power input of the waveform generator may be coupled to the DC output of the H-bridge rectification device. Advantageously, the waveform generator is powered by the DC output, such that an additional power supply is not required.

The waveform generator may comprise a half-bridge or full bridge converter coupled between the first and second DC outputs of the H-bridge rectifier. The waveform generator may comprise a plurality of half-bridge or full-bridge rectifiers connected in series.

A power input of the waveform generator may be coupled to an energy storage device such as a chemical battery, capacitor or fuel cell. The energy storage device may be coupled across terminals of a capacitor of the half-bridge inverter.

A DC to DC converter configured to provide a constant input voltage to the waveform generator may be provided between the input to the waveform generator and the energy storage device. The DC to DC converter may be coupled across opposite terminals of a capacitor of the half-bridge inverter.

The waveform generator may comprise a half-bridge or full-bridge inverter coupled across either of the positive and negative DC output side of the H-bridge rectification device. The conversion device may comprise a first inverter coupled across the positive DC output of the H-bridge rectification device, and a second inverter coupled across the negative DC output of the H-bridge rectification device. The waveform generator may comprise a fixed voltage input coupled between an input of the inverter and the negative or positive DC output of the H-bridge rectification device. The waveform generator may comprise a plurality of half-bridge or full-bridge inverters coupled in series across the positive or negative DC output of the H-bridge rectification device. Advantageously, the fixed voltage source can be used to form all or part of the total DC output voltage with little or no voltage ripple. When combined with an energy storage device, this provides for a hybrid DC power source, in which power can be provided from one or a mixture of the electrical generator and the energy storage device.

According to a second aspect, there is provided an electrical generation system comprising:
an electrical generator comprising a stator comprising one or more stator windings arranged in one or more phases; and
an AC to DC conversion device according to the first aspect coupled to the stator windings of the electrical generator.

The electrical generator may comprise two or more phases. First and second terminals of each phase may be associated with a respective AC to DC conversion device.

The electrical generator may comprise a plurality of phases configured to operate at 2π/n radians from one another, where n represents the number of phases.

In one example, the electrical generator comprises three phases configured to operate at 2π/3 radians from one another.

The electrical generation system may comprise an AC to DC conversion device associated with each phase, having DC outputs connected in series. Advantageously, certain voltage harmonics of the DC are canceled, such that the system provide a smooth DC output. The electrical generation system may comprise a DC harmonic filter coupled to the DC output of the electrical generation system.

The waveform generator may be configured to provide a voltage to oppose the back EMF waveform of the DC output of the H-bridge rectification device. Advantageously, in the event of a short-circuit fault in the DC output, the system can be configured to oppose the DC output current, to drive the DC output to zero current. Consequently, the system can be safely interrupted in the event of a fault.

The electrical generator and waveform generator may each be configured to provide a non-sinusoidal waveform such as a trapezoidal waveform. Advantageously, higher order harmonic components of the DC output current can be reduced or eliminated.

The electrical generator may comprise concentrated or distributed stator windings. Advantageously, such an arrangement can be used to generate a trapezoidal output voltage.

According to a third aspect there is provided a method of operating an AC to DC conversion device in accordance with the first aspect, the method comprising providing a unidirectional waveform to the DC output, the unidirectional waveform having the same magnitude and fundamental frequency as the rectified back EMF, phase shifted by a predetermined angle relative to the rectified back EMF waveform.

According to a fourth aspect there is provided a vehicle comprising an electrical generation system according to the second aspect.

The vehicle may comprise one or more of a marine vessel and an aircraft.

The aircraft may comprise one or more gas turbine engines. An output shaft of the gas turbine engine may be coupled to a rotor shaft of the electrical generator.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which:

FIG. 8 is a flow diagram illustrating conversion steps of the AC to DC conversion device of FIG. 3;

DETAILED DESCRIPTION

Figure 1:
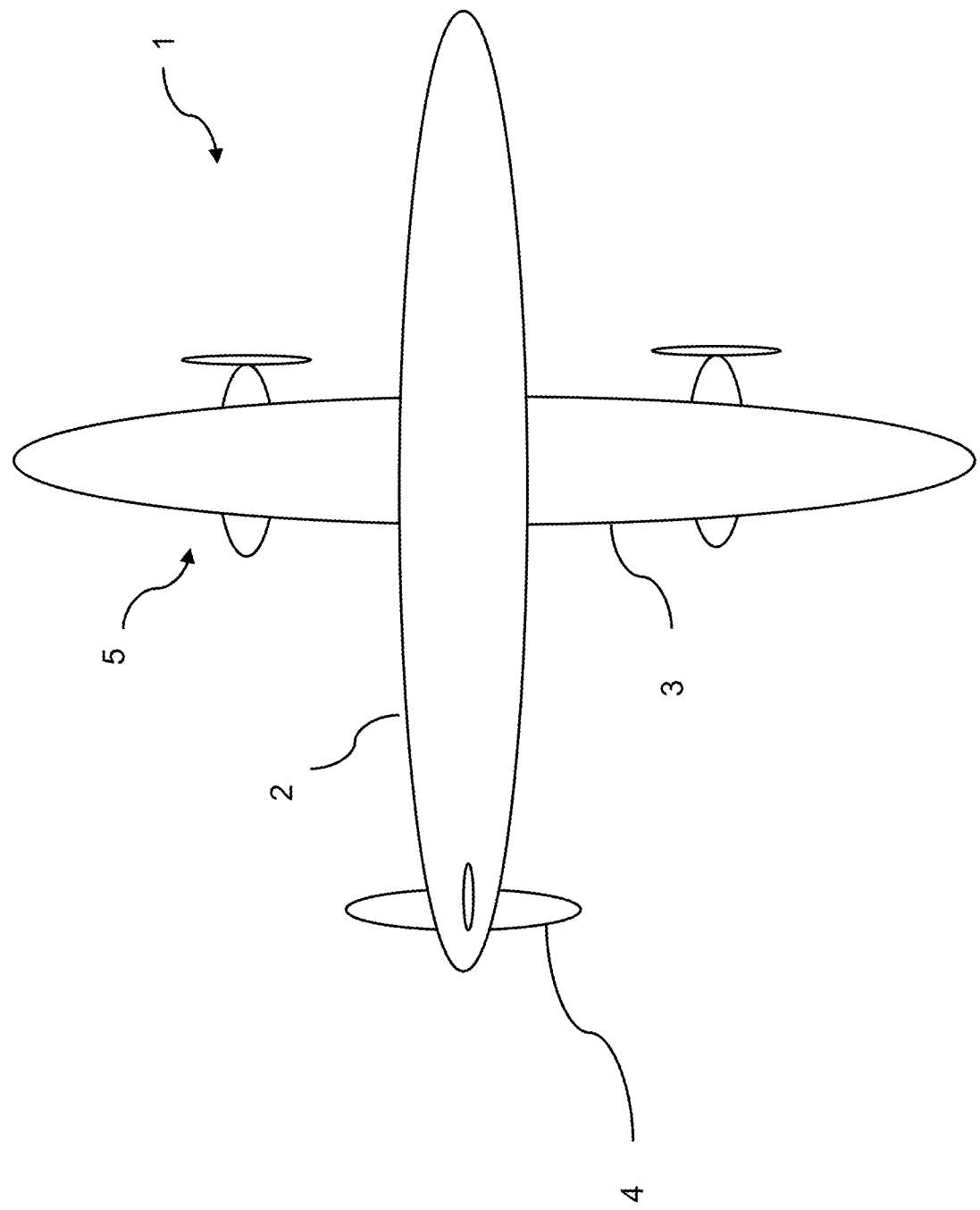
FIG. 1 is a plan view of an aircraft.

With reference to FIG. 1, an aircraft 1 is shown. The aircraft is of conventional configuration, having a fuselage 2, wings 3, tail 4 and a pair of propulsion systems 5. One of the propulsion systems 5 is shown in figure detail in FIG. 2.

Figure 2:
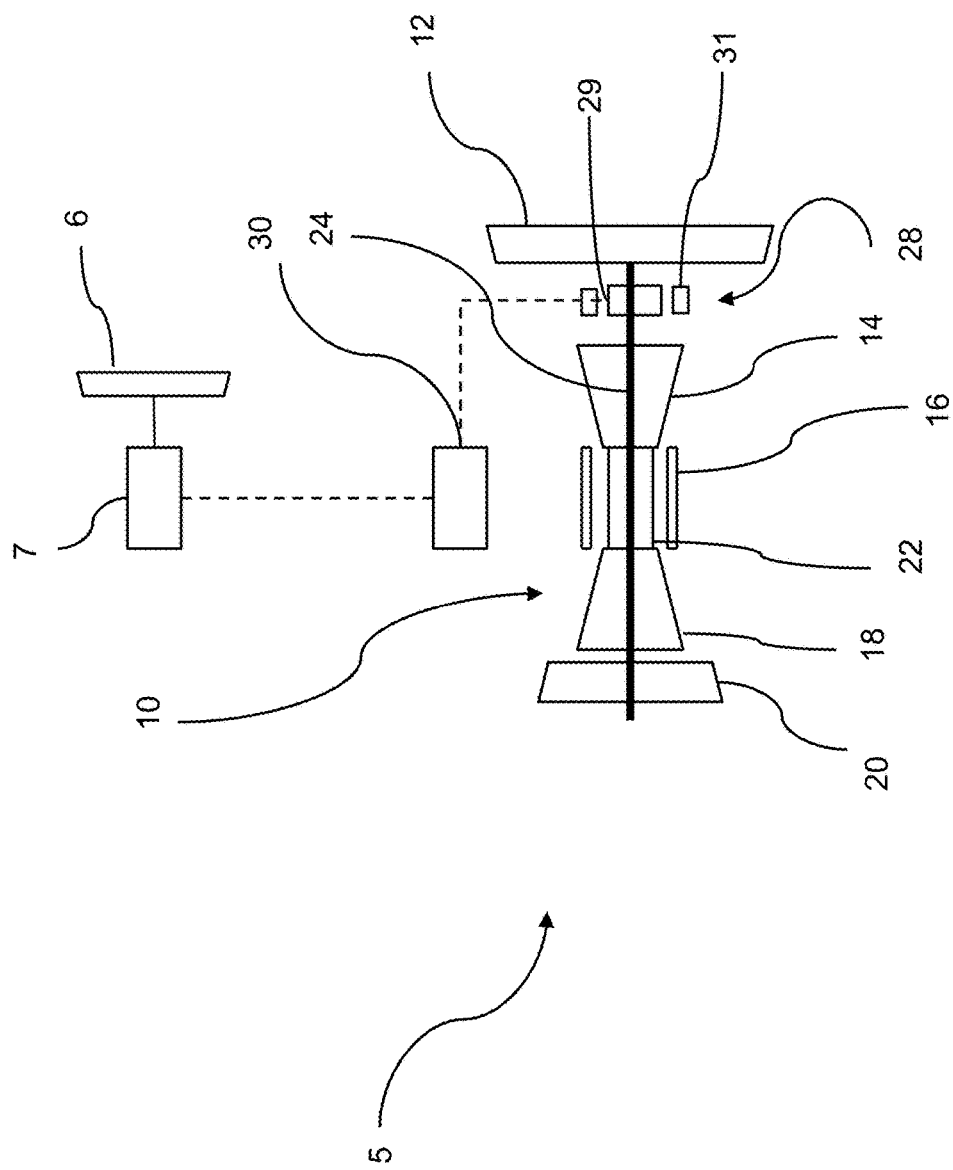
FIG. 2 is a schematic view of a propulsion system of the aircraft of FIG. 1.

FIG. 2 shows the propulsion system 5 schematically. The propulsion system 5 includes an internal combustion engine in the form of a gas turbine engine 10. The gas turbine engine 10 comprises, in axial flow series, a propulsor in the form of a fan 12, a compressor 14, combustion equipment 16 and high and low-pressure turbines 18, 20.

The gas turbine engine 10 works in the conventional manner so that air is accelerated by the fan 12 to produce two air flows: a first core air flow into the compressor 14 and a second air flow which bypasses the compressor 14 to provide propulsive thrust. The core air flows through the compressor 14 where it is compressed, before delivering that air to the combustion equipment 16, where it is mixed with fuel and the mixture combusted. The resultant hot combustion products then expand through, and thereby drive the turbines 18, 20 before being exhausted through a nozzle to provide additional propulsive thrust. The high 18 and low-pressure turbines 18, 20 drive respectively the compressor 14 and fan 12, each by suitable interconnecting shaft 22, 24.

Other gas turbine engines to which the present disclosure may be applied may have alternative configurations. By way of example such engines may have an alternative number of interconnecting shafts (e.g. three) and/or an alternative number of compressors and/or turbines. The engine may comprise a gearbox provided in the drive train from a turbine to a compressor and/or fan.

The propulsion system 5 further comprises one or more electrical machines driving one or more propulsors. For example, the system includes an electrically driven propulsor 6 driven by an electrical motor 7. The system 5 further comprises an electric generator 28. The generator 28 is of a conventional type, such as a wound field machine having separate excitation control of the AC terminal voltage, or a permanent magnet electric machine. In the present embodiment, the generator 28 is coupled to the low-pressure shaft 24. In this embodiment, the electric generator 28 is of a "core shaft mounted" type, in which a rotor 29 of the generator 28 is mounted directly to a surface of the low-pressure shaft 24, and is surrounded by a stator 31, provided radially outwardly of the rotor 29. The stator comprises electrical windings (34a-c), which can be energised by the rotating magnetic field of the rotor 29 to produce an electric current. It will be understood that other generator types could be employed, and the generator 28 could be coupled to different shafts of the gas turbine engine 10.

The electric generator 28 is coupled to one or more loads (such as motor 7), and, optionally, an energy storage device 30 in the form of one or more of a chemical battery or capacitors, which stores power generated by the electric generator 28 during operation. In some cases, multiple energy storages systems, which may be of different types (chemical battery, capacitors etc.) may be provided for each propulsion system 5. In other cases, a common energy storage device 30 may be provided for multiple propulsion systems.

Figure 3:
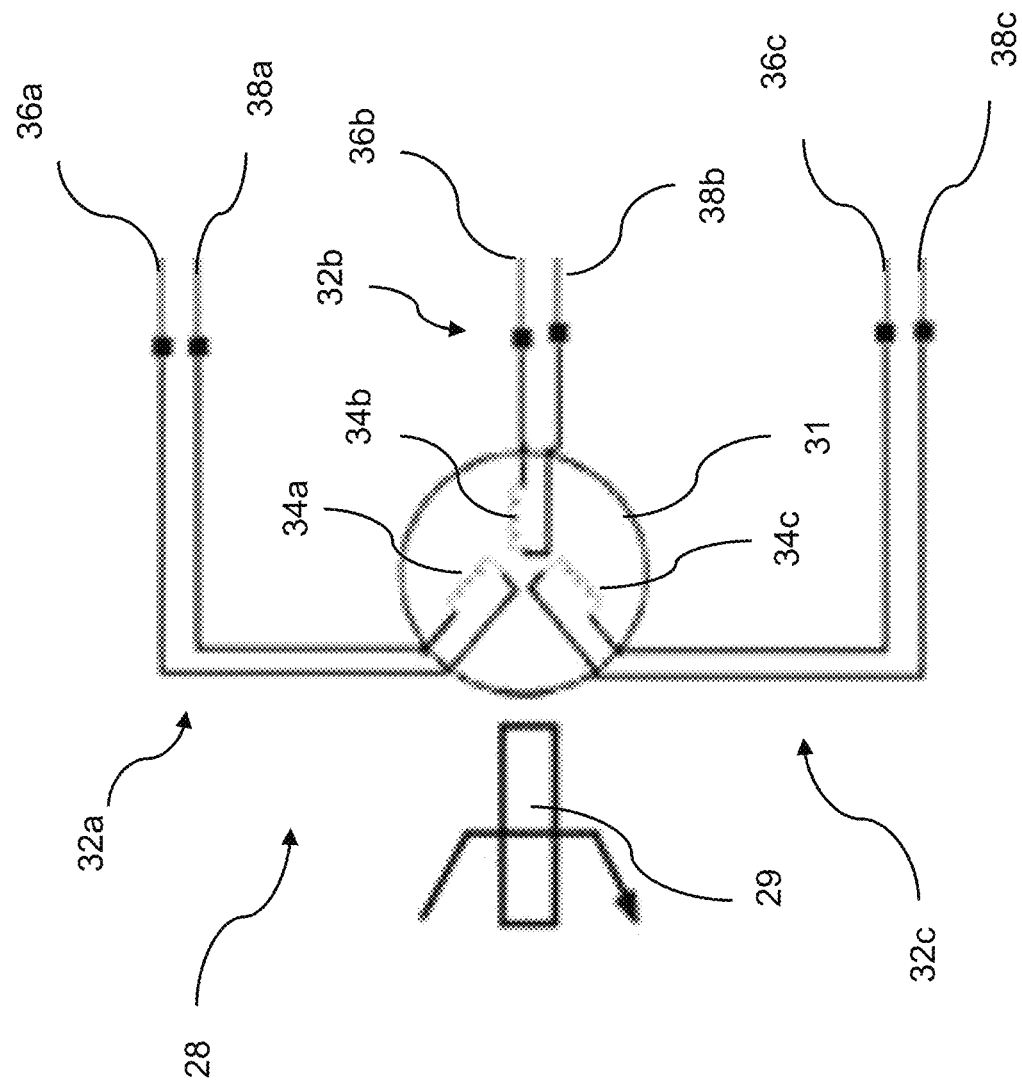
FIG. 3 is an electrical schematic of a part of an AC to DC conversion device for the propulsion system of FIG. 2.

Referring now to FIG. 3, the generator 28 is typically a three-phase machine comprising first, second and third stator output phases 32a-c, though it will be understood that the disclosed arrangement is applicable to generators having two or more phases. Each phase comprises a respective stator coil 34a-c and respective first 36a-c and second 38a-c terminals, giving a total of 2n terminals, where n is the number of phases. Such an arrangement may be referred to as "isolated windings", since the windings do not connect together at a star point. In general, each phase is arranged to operate at $2\pi/n$ radians from an adjacent phase, where n is the number of phases (in this example, three). Consequently, in this example, each phase is $2\pi/3$ radians out of phase with an adjacent phase, i.e. 120°.

As will be understood, the generator 28 produces an AC electrical output. For many applications, it is desirable to convert this AC output to a DC output, either as a final step, or as an intermediate step when converting an AC current to a different frequency. The generator 28 is coupled to an AC to DC converter (also known as a rectifier 40) to convert the AC output to a DC output. Together, the generator 28 and converter 40 make up an electrical generation system 27.

Figure 4:
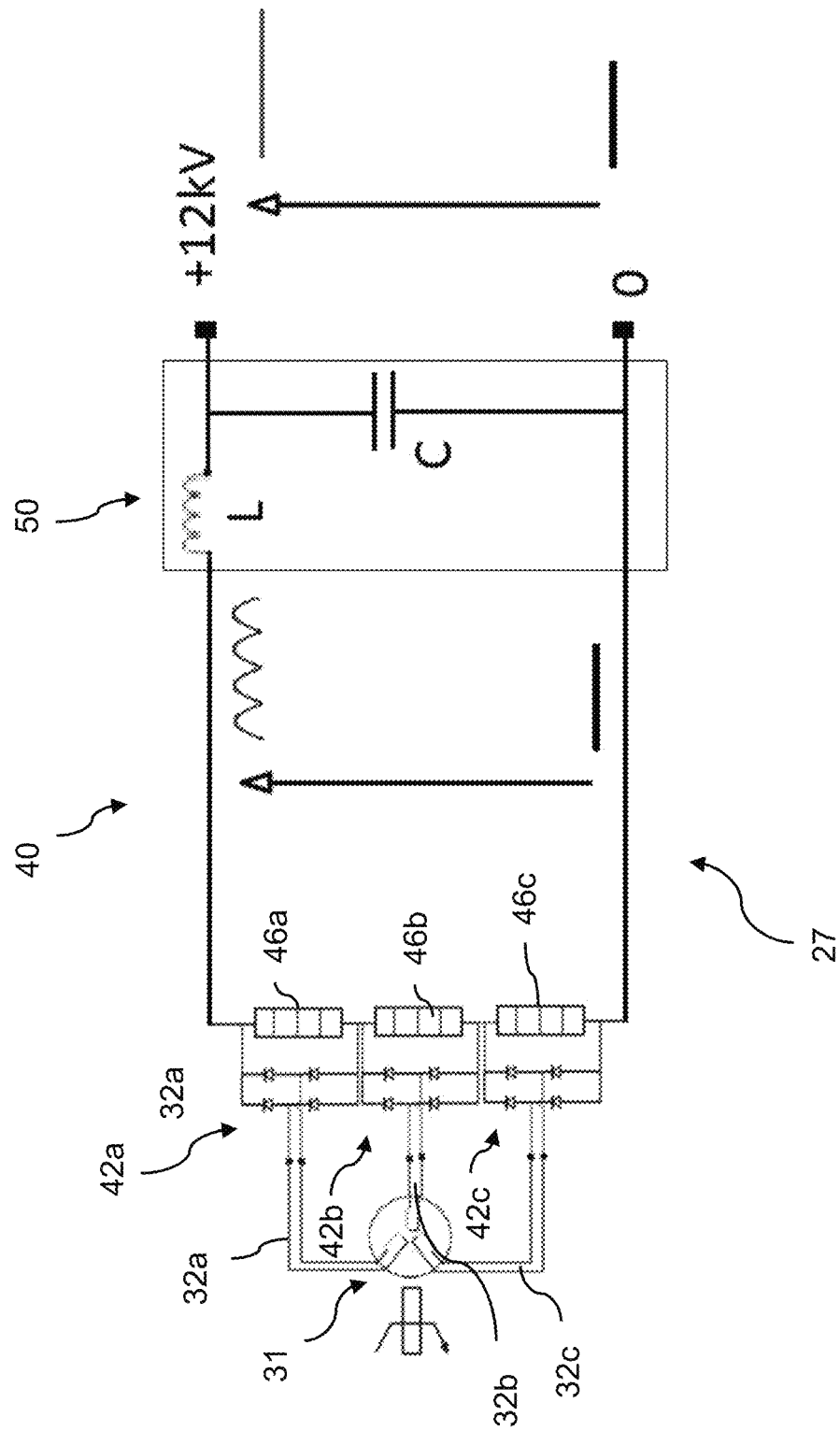
FIG. 4 is an electrical schematic of the full AC to DC conversion device of FIG. 3.

Details of a first implementation of the AC to DC converter 40 are shown in FIG. 4. The AC to DC converter 40 comprises a plurality of diode H-bridge rectifiers 42a-c. A respective diode H-bridge rectifier 42a-c is coupled to each phase 32a-c. An H-bridge architecture associated with each phase is chosen since the associated voltage wave-shaper (detailed below) can only impact the phase it is associated with. This would not be the case with, for example, 3-phase rectifiers like 6-pulse diode rectifiers.

Figure 5:
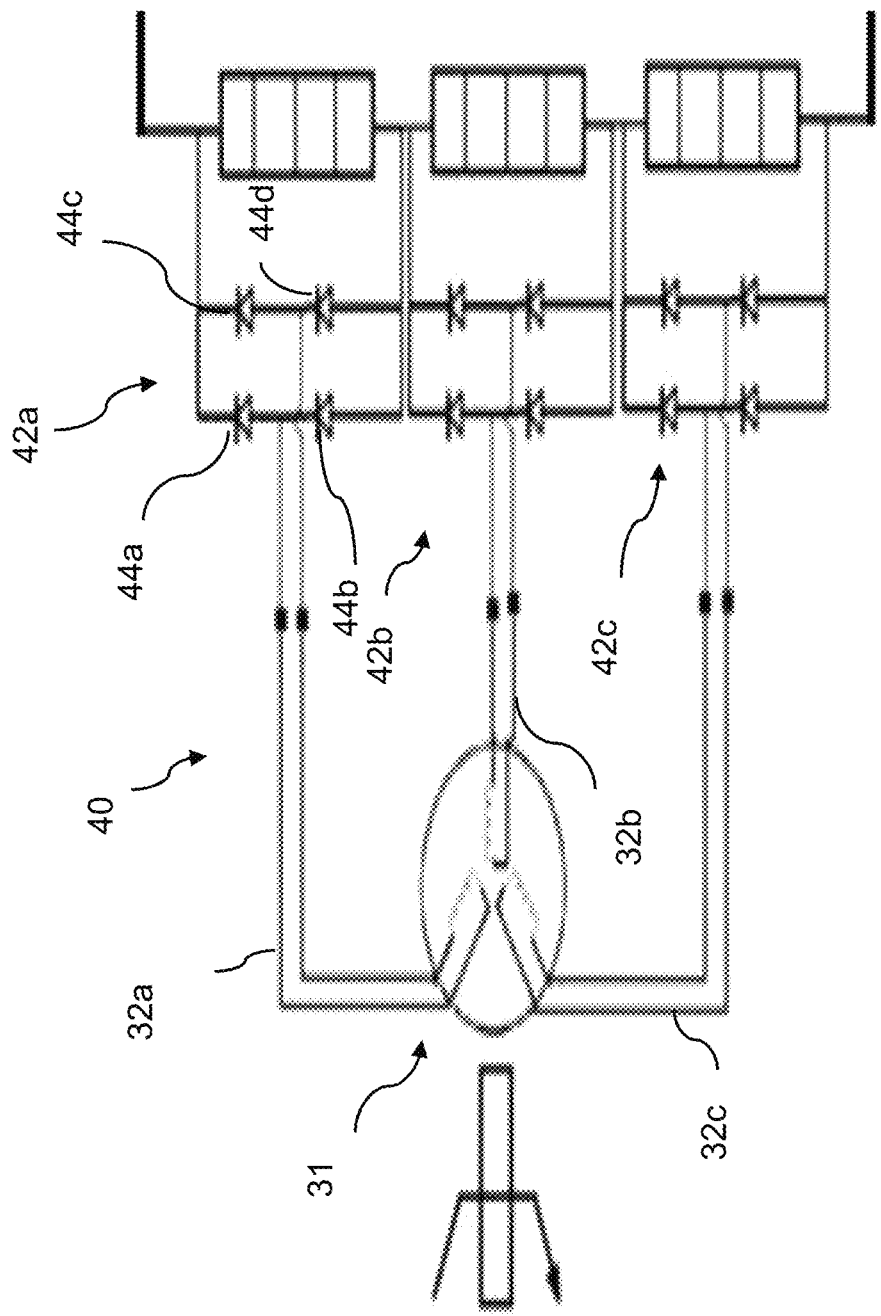
FIG. 5 is an electrical schematic of part of the conversion device of FIG. 4.

As shown in more detail in FIG. 5, each H-bridge rectifier comprises a pair of diodes 44a,b, 44c,d. As will be understood, diodes comprise passive electronic components having high resistance in a first current direction, and low resistance in a second current direction. The diodes 44a-d in each pair are arranged in series, with the anode of one diode connected to the cathode of the other diode, and a respective one of the AC terminals 36, 38 coupled between the diodes, such that current can flow toward the anode, but not toward the cathode, as is conventional in an H-bridge rectifier. By providing a diode pair for both AC output terminals 36, 38 for each phase 32a-c, full wave rectification is provided. Where higher currents are required, diode pairs may be stacked in parallel for each terminal to provide the necessary power capacity.

Consequently, the diode H-bridge rectifier 42a-c provides a DC output current ("rectified back EMF") at the anode, and a negative or neutral output at the cathode. A harmonic filter 50 is also provided. Referring again to FIG. 4, the harmonic filter 50 comprises an inductor L provided at one of the DC outputs of the AC to DC converter, and a capacitor C provided between the anode and cathode sides of the full DC output of the AC to DC converter, to smooth DC output and eliminate particular harmonics. Since the converter is connected in series, and the phases are operated at $2\pi/3$ radians out of phase with one another, the $2^{nd}$, $4^{th}$, $85^{th}$ and $10^{th}$ harmonics are canceled at the summed output voltage. This leaves only the $6^{th}$, $12^{th}$, $18^{th}$ etc. harmonics to be canceled, which can easily be achieved with a practical harmonic filter.

Where multiple phases are present, the H-bridge rectifiers 32a-c of each phase are provided in series, with the cathode output of the first phase rectifier 32a coupled to the anode output of the second phase rectifier 32b, and the cathode output of the second phase rectifier 32b coupled to the anode output of the third phase rectifier 32c. Consequently, a relatively constant DC current is provided. In particular, by providing a generator having equally spaced phase angles (e.g. 120° in the case of a three-phase generator), the $2^{nd}$, $4^{th}$ $8^{th}$ and $10^{th}$ harmonic voltages can be canceled, leaving only $6n^{th}$ phases (i.e. $6^{th}$, $12^{th}$, $18^{th}$ etc.) voltage harmonics at the DC bus. Given a relatively high fundamental frequency, (e.g. 360 HZ), the $6^{th}$ harmonic then has a frequency of approximately 2.16 kHZ, which may be practically filtered using the passive harmonic filter (i.e. capacitor C and inductor L).

However, due to the continuously varying input current from the AC input, the DC output current also varies over time to an extent. The present disclosure comprises a voltage wave shaper, which aims to reduce or eliminate this variation in DC output voltage.

The voltage wave-shaper comprises a waveform generator 46a-c coupled between the anode and cathode of the DC output of each H-bridge diode rectifier 32a-c. Consequently, the waveform generators 46a-c are also arranged in series where multiple phases are provided. The waveform generators are provided such that the output of a H-bridge rectifier 32a-c is provided in parallel with both an adjacent H-bridge rectifier 32a-c and an adjacent waveform generator 46a-c.

Figure 6:
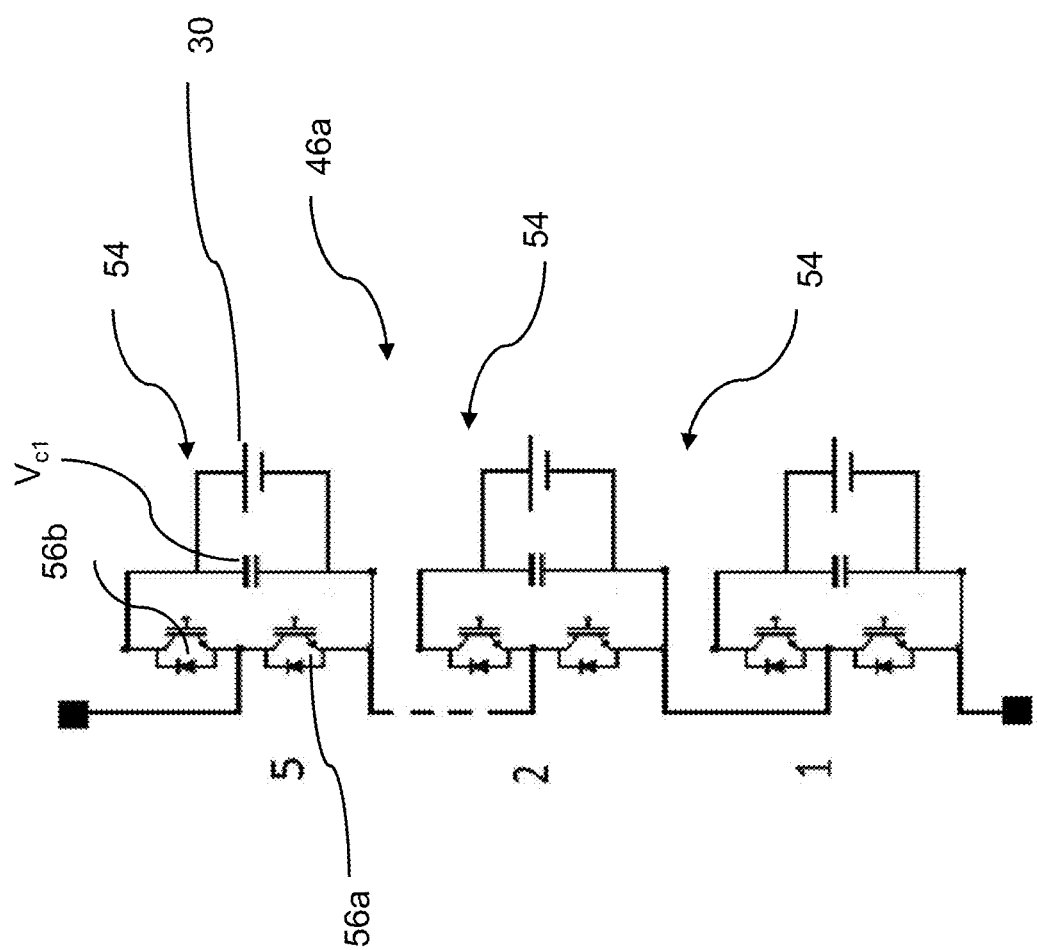
FIG. 6 is an electrical schematic of a waveform generator of the conversion device of FIG. 4.

The internal configuration of an example waveform generator 46a is shown in FIG. 6. Each waveform generator 46a-c comprises at least one inverter 54 configured to input a unidirectional waveform to the DC output of the respective H-bridge diode rectifier 32a-c having the same magnitude and frequency as the rectified back EMF output of that diode H-bridge, phase shifted by a predetermined angle relative to the rectified back EMF waveform. The waveform is typically of the same general form (e.g. trapezoidal, sinusoidal etc.) as the generator back EMF AC waveform generated by the generator 28, but phase shifted by a controlled angle. If the waveform is of the same form as the generator back EMF, both the fundamental and harmonic frequencies will be equal if the fundamental frequencies are equal. In practice, the waveform generated by the generator 46a-c is a stepped approximation of the rectified back-EMF of the generator, in view of the finite number of voltage levels provided by the inverter 54. Since the rectifier 42 is an H-bridge rectifier (not a half-bridge rectifier, or any other form of rectifier only capable of rectifying a positive or negative fraction of an AC voltage), it converts the uni-directional voltage from the waveform generator into a bidirectional alternating voltage to interface to the back EMF of the generator 28. This is sometimes called an "unfolding" circuit.

The phase angle lags the back EMF output by a controlled angle. This angle delay is required to enable real power to flow from the generator into each phase of the converter, and is equivalent to the known load angle associated with AC power flow through predominately inductive transmission links. The series inductance which provides the control medium is the impedance of the electrical machine itself.

Figure 9:
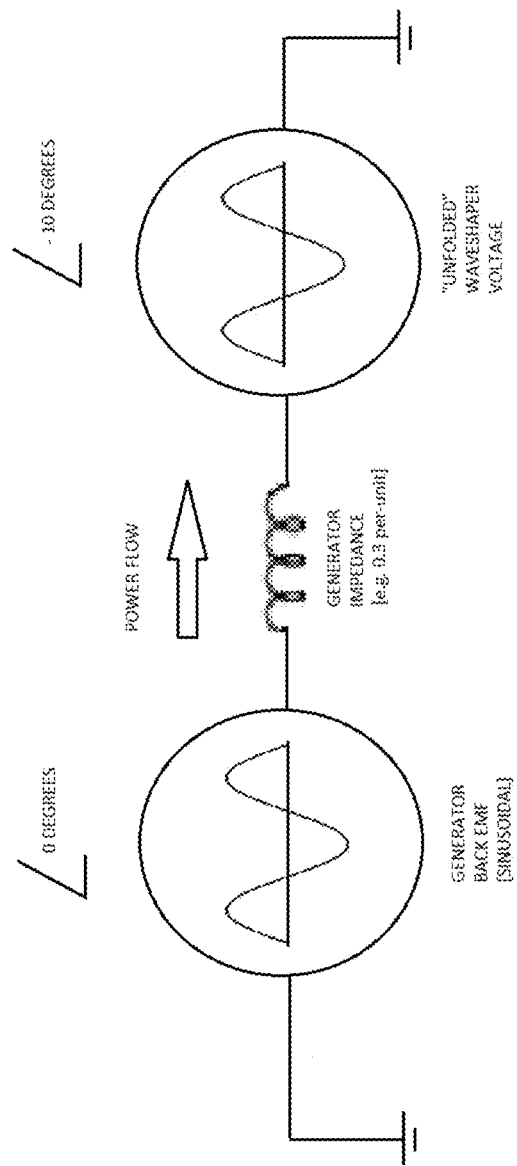
FIG. 9 is a schematic illustrating control method for the conversion device of FIG. 3.
Figure 20:
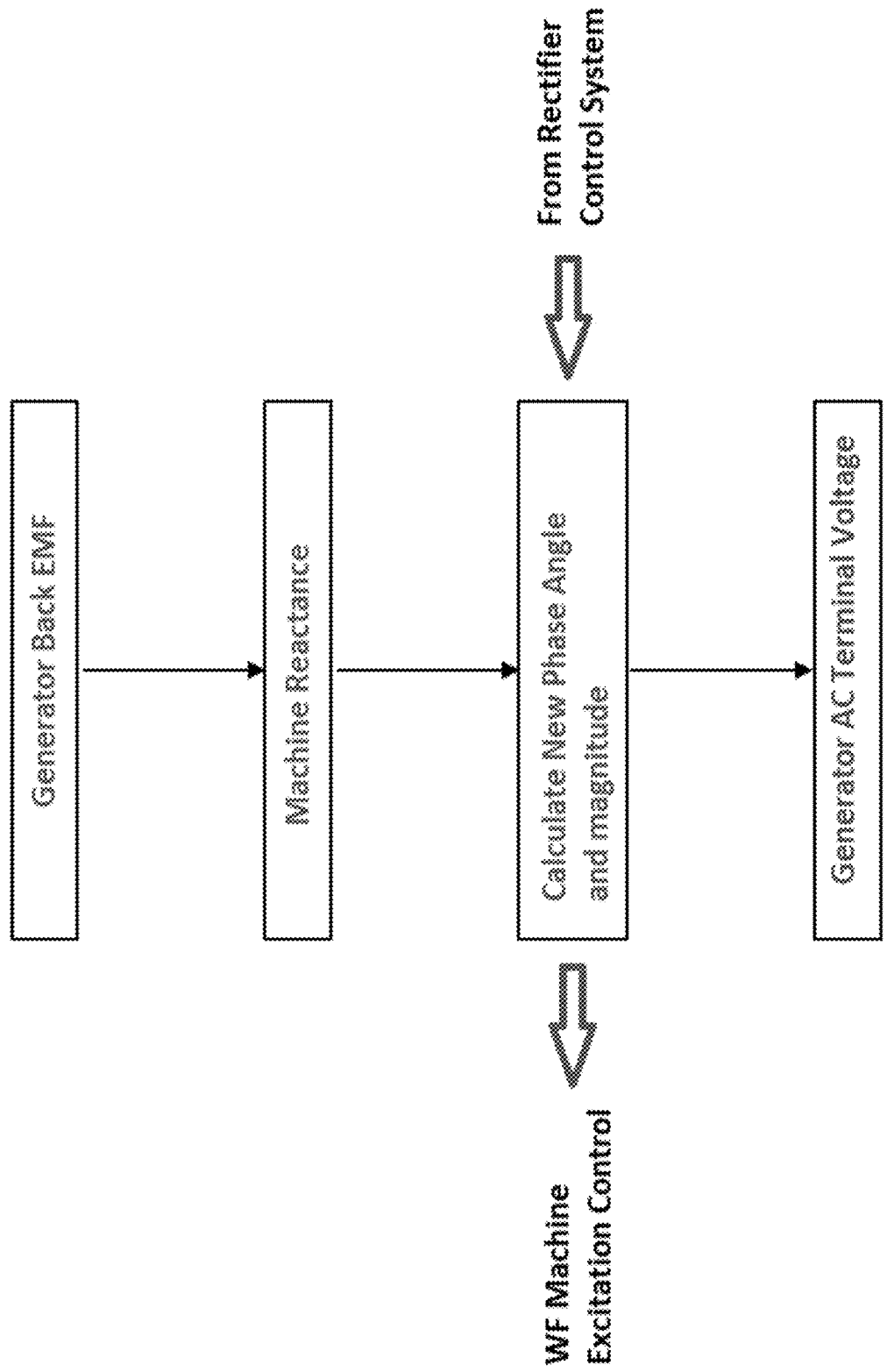
FIG. 20 is a flow diagram illustrating a method of controlling the conversion device of FIG. 3.

This method of operation is illustrated in FIGS. 9 and 20. As will be appreciated, a lagging phase angle between the AC and DC side greater than zero is necessary, such that the power transfer from the AC to DC side is greater than zero. The predetermined phase angle is calculated in response to a closed loop control system which controls DC voltage or DC power, and follows the basic power system equation for power flow in AC systems:

$$P = \frac{EV\sin\delta}{XL}$$

where E is the back EMF of the AC input, V is the converter AC terminal voltage, XL is the machine inductive reactance, and δ is the phase shift. This is illustrated in FIGS. 9 and 20. Consequently, by measuring E, V, and XL, a corresponding phase angle δ can be calculated for a given required power P. In practice, a controller may implement a control scheme based on the above equation. For example, the controller may comprise a closed-loop control such as a PID controller, which aims to minimise an error between a measured and a target parameter. For example, the controller may respond to DC network power demand derived from a measurement of voltage and current. Alternatively, it might respond to keep the DC voltage fixed at a predetermined voltage, such as 12 kV. The DC voltage would naturally reduce when a load is applied, so the phase angle would adjust itself until there is a balance between the power from the generator equal to that of the load plus any losses in the converter. In the method shown in FIG. 20, machine reactance is input to calculate a new phase angle and magnitude to generate a target generator AC terminal voltage. In the case of a wound-field generator, the controller can adjust magnitude of the AC output voltage from the generator by controlling field strength in the rotor coils. In such a case, the back EMF from the generator can be controlled by varying the current transmitted through the field windings. Consequently, the controller may be configured to both control generator field winding current in order to control generator output AC voltage, and DC output from the waveform generator in order to rectify this voltage.

As shown in FIG. 8 therefore, a method of operation of the AC to DC converter 40 is described. In a first step, AC electrical energy from each phase of the generator 31 is input to a respective input 32a phase. In this example, the generator output voltage is in the form of a time-varying sinusoidal waveform, which alternates between a positive and a negative direction (i.e. in which the current flow flows in a first direction, followed by a second direction). In a second step, the respective diode-bridge rectifier 42a converts the generator output voltage to a rectified output voltage. As can be seen, the negative half of the generator output voltage waveform is converted to a positive voltage, such that a uni-directional (i.e. comprising current flow in a single direction) rectified back-EMF is defined at an output of each diode-bridge rectifier 42a-c.

In a third step, the rectified back-EMF voltage is combined with that of a waveform generator output, which comprises the same waveform fundamental frequency as the rectified back-EMF waveform, having a phase lag as defined above. When combined, this generates a DC output voltage at the output of the device, having a substantially constant voltage over time. Any small perturbations in the DC output waveform can be corrected by the relatively small inductor and capacitor provided in the circuit.

Referring again to FIG. 6, the waveform generator 46 typically comprises an inverter configured to provide an AC waveform of the appropriate type, magnitude and fundamental frequency. The waveform must be unidirectional, since negative voltages would force the diodes of the H-bridge rectifiers into conduction. A first example waveform generator 46a is shown in FIG. 6.

The waveform generator 46a comprises one or more sub-modules 54 connected across the anode and cathode of the DC outputs of the H-bridge rectifier circuit. Where more than one sub-module is provided, these are connected in series across the anode and cathode of the DC outputs of the H-bridge rectifier circuits. By providing a plurality of sub-modules, a multi-level inverter is provided. Since a uni-directional voltage is required, a half-bridge module can be used to provide the required waveform.

Figure 10:
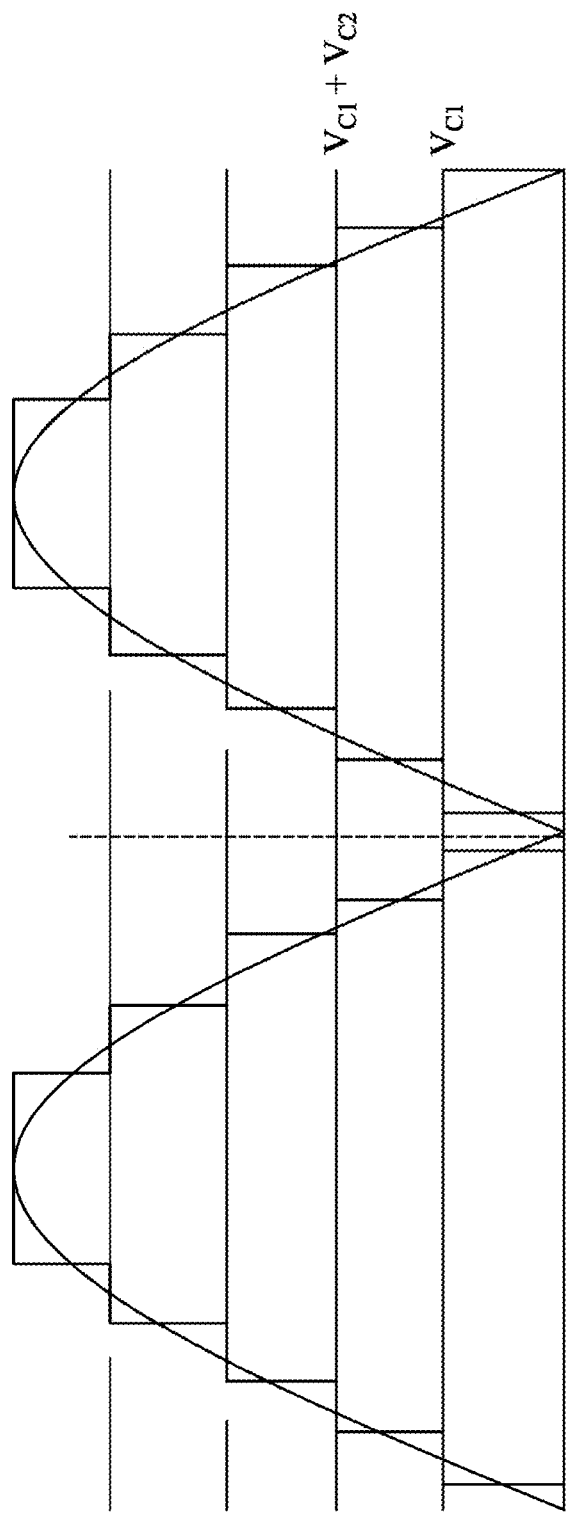
FIG. 10 is a graph illustrating a waveform generated by the waveform generator of any of FIG. 6 or FIG. 7.

Each sub-module 54 comprises a half-bridge inverter comprising first and second switches in the form of transistors 56a, 56b. The transistors 56a, 56b of each module are connected in series with one another, with an anode connection provided in between the transistors 56a, 56b, and a cathode connection provided between the cathode connection of the first transistor 56a, and the anode connection of an adjacent submodule module 54 or cathode connection of the DC output in the case of the last submodule in the series. Each sub-module further comprises a capacitor $V_{C1}$, $V_{Cn}$, connected between the anode of the transistor 56b, and the cathode of the transistor 56a. In operation, each sub-module can contribute a low (substantially zero) voltage or a high voltage (equal to the capacitor voltage $V_c$) when the first and second transistor 56a, 56b is turned on respectively, allowing for n+1 voltage steps to be provided (where n in this case is the number of sub-modules 54). By cycling through these voltage steps, a waveform approximating a desired curve (e.g. sinusoidal, trapezoidal etc.) can be generated, as shown in FIG. 10. In the example described in this disclosure, five sub-modules are provided, though only three are shown in FIG. 6. This form of waveform generator is particularly suitable for use with a harmonic filter, as described above, for eliminating $6^{th}$, $12^{th}$, $18^{th}$ etc. harmonics.

Optionally, each sub-module may comprise a chemical battery, which may comprise a separate battery for each sub-module, or a connection to a common battery (such as energy storage device 30) for each of the sub-modules. Where separate batteries are provided for each phase, the failure of a battery results only in failure of the corresponding phase, and so the system is more robust than where a single common battery is provided. The battery is coupled in parallel across each capacitor $V_{C1}$, $V_{Cn}$ ... etc., and may in some cases replace the capacitor. Alternatively, a larger supercapacitor could be provided in place of the capacitor $V_{C1}$, $V_{Cn}$ ... etc. and battery 30, having a larger storage capacity. The battery/supercapacitor 30 is able to provide significant power injection to the network, rather than merely controlling power input to the network from the generator 28. In this variant, the battery 30 can provide additional power for short or long periods of time, to allow the prime mover which rotates the generator rotor 29 (e.g. the gas turbine engine piston engine, or other form of torque input) time to slowly increase rotor torque. This can be advantageous, since the acceleration and deceleration capacity of the prime mover does not have to match the transient power demand increase and reduction of the loads. For instance, this may allow for sudden load increases, without requiring sudden increases in gas turbine engine torque. This system also acts as a battery controller, thereby reducing the requirement for a separate battery controller for the hybrid powertrain.

Figure 7:
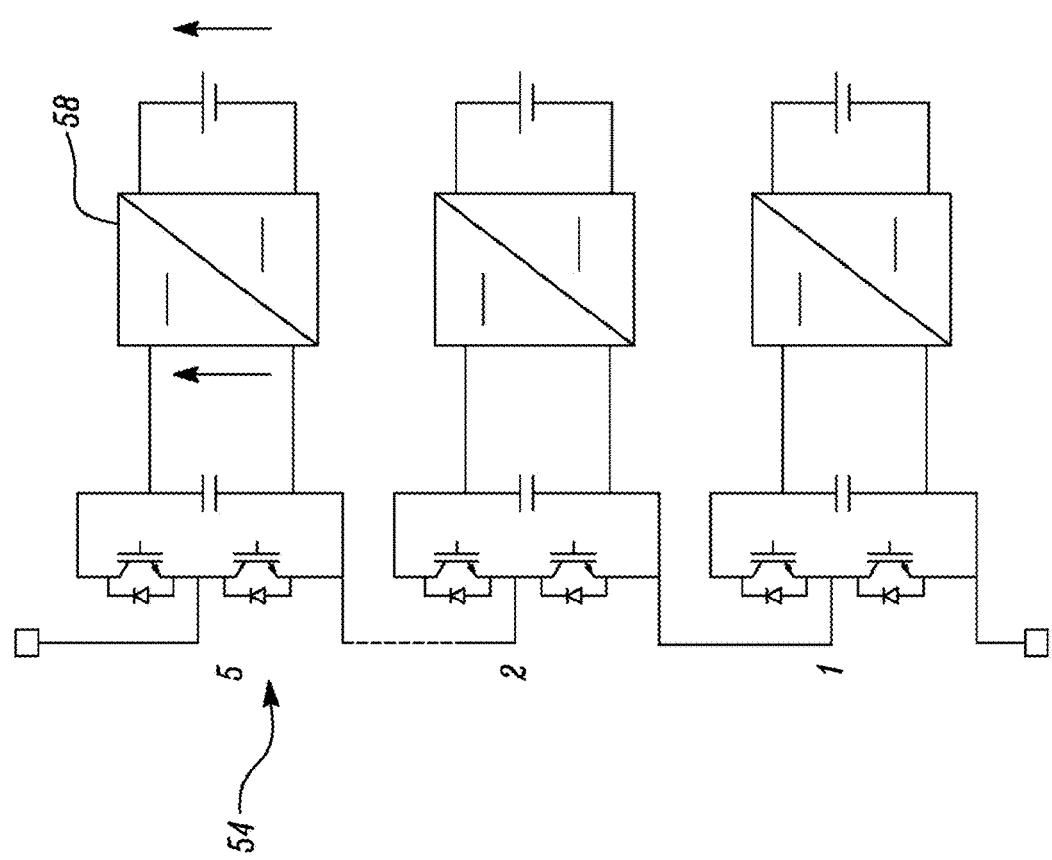
FIG. 7 is an electrical schematic of a variation of the waveform generator of FIG. 6.

As shown in FIG. 7, an optional DC-DC converter 58 could be provided at the interface between each battery 30 and the respective capacitor $V_{C1}$, $V_{Cn}$ . . . etc. The DC-DC converter 58 can be configured to maintain a constant voltage at the capacitor, as the battery 30 charges and discharges. In other words, the DC-DC converter 58 acts as a battery controller. Alternatively, the DC-DC converter 58 can be omitted. In this case, the voltage from the battery 30 will vary as it charges and discharges. In this case, the number of sub-modules 54 required to obtain a given voltage level will then also vary. The system may be controlled to account for this. For example, in one embodiment, at a higher level of charge, four sub-modules 54 may be used to provide a waveform having four distinct voltage levels, to provide a maximum voltage when all four sub-modules are active. At a lower level of charge, five sub-modules 54 may be used to provide a waveform having five distinct voltage levels, to provide a maximum voltage when all five sub-modules are active. The voltage level when all five modules are active at a lower battery charge may by the same or approximately the same as when only four modules are active at a higher battery charge, in view of the lower voltage steps provided by the individual sub-modules.

It will be appreciated that there are significant benefits of designing the generator 31 to produce back EMF waveforms which are non-sinusoidal. In particular, if the rectified generator voltage produced by the rectifiers 32*a-c* can be arranged not to contain $6^{th}$ and $12^{th}$ harmonic components, then these voltage harmonics can be removed from the unidirectional waveforms produced by the associated waveform generators 46*a-c*, and they will not appear in the summed output voltage at the DC network or load. Clearly this would reduce or eliminate the amount of passive filtering required.

An example of how the generator back EMF and waveshaping converter waveforms may be constructed such that they are non-sinusoidal is illustrated in FIG. 19. Here, the waveforms are arranged to be trapezoidal in shape and sum to a constant voltage at the DC network. In practice, given the voltage waveforms produced by the power electronic based voltage waveform generators 46*a-c* are stepped approximations to the rectified trapezoidal waveforms, some high frequency "noise" will remain in the summed output voltage. This should require a very low level of filtering to remove in any practical converter.

Figure 16:
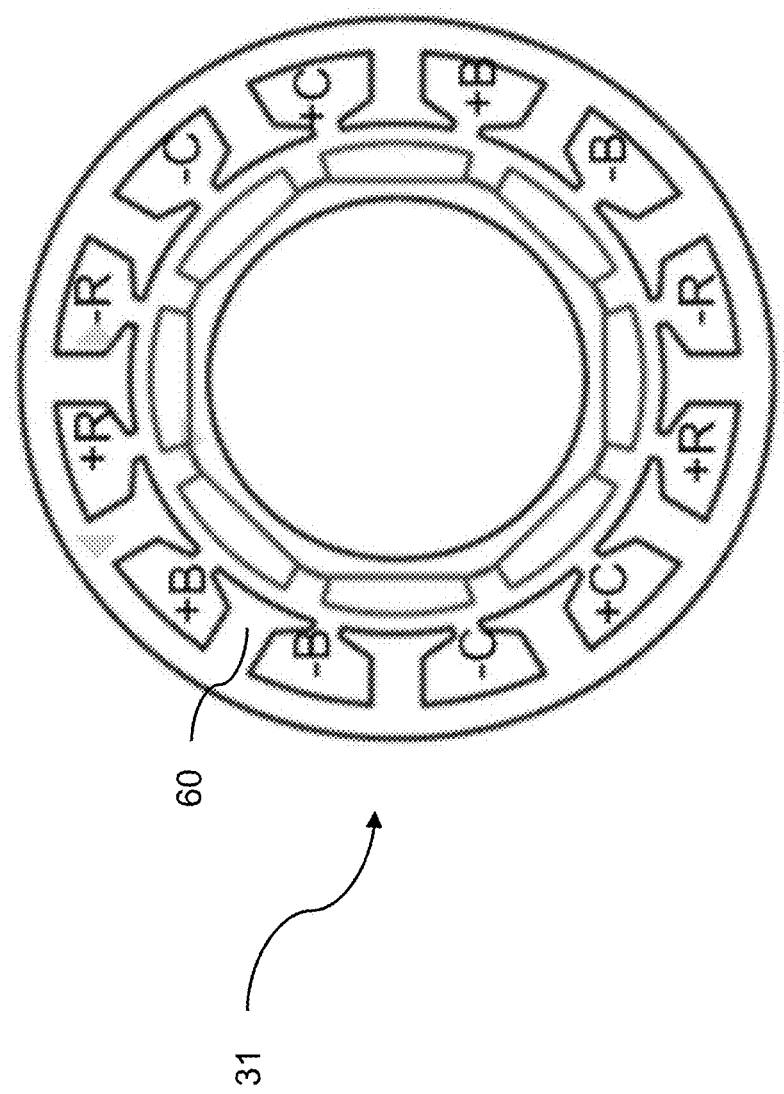
FIG. 16 is a stator of a three-phase electrical generator for the propulsion system of FIG. 2.
Figure 17:
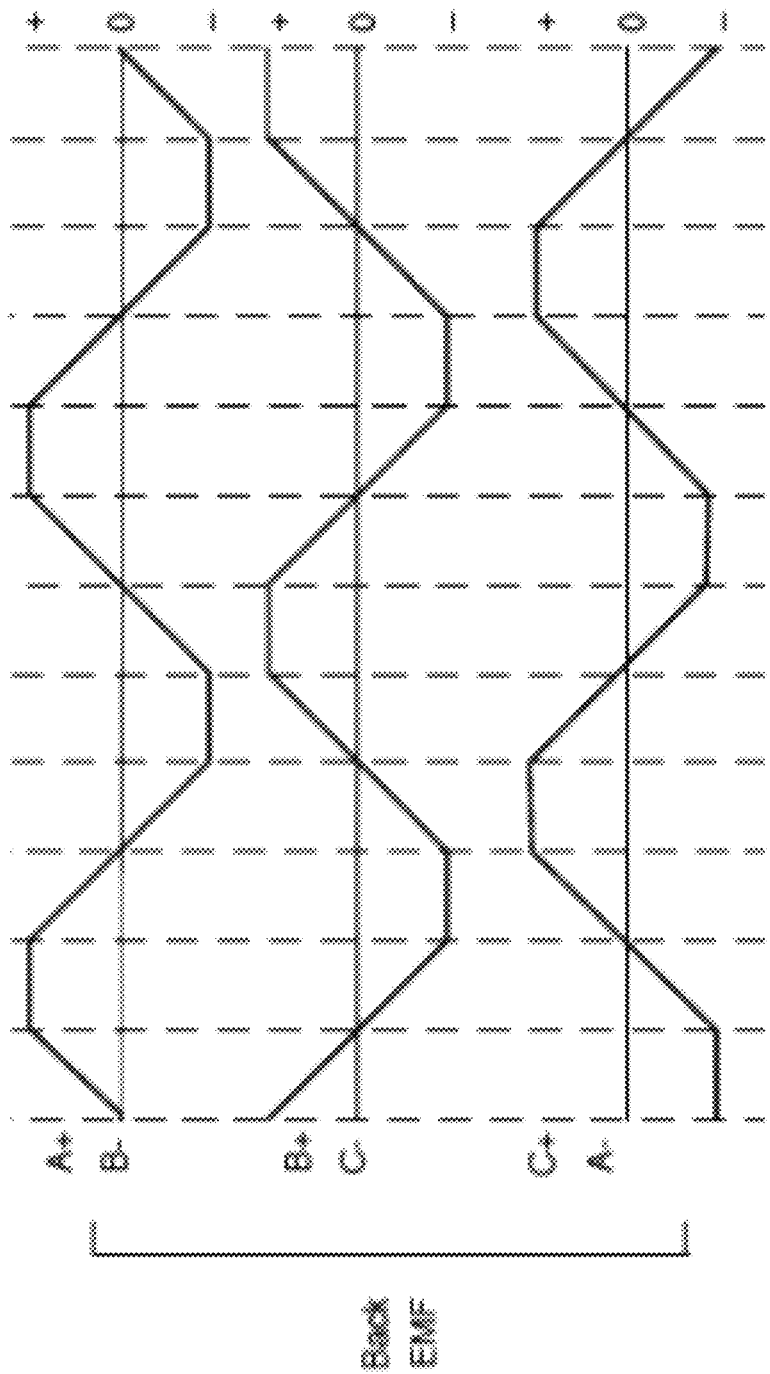
FIG. 17 is a waveform generated by the electrical generator of FIG. 12.
Figure 18:
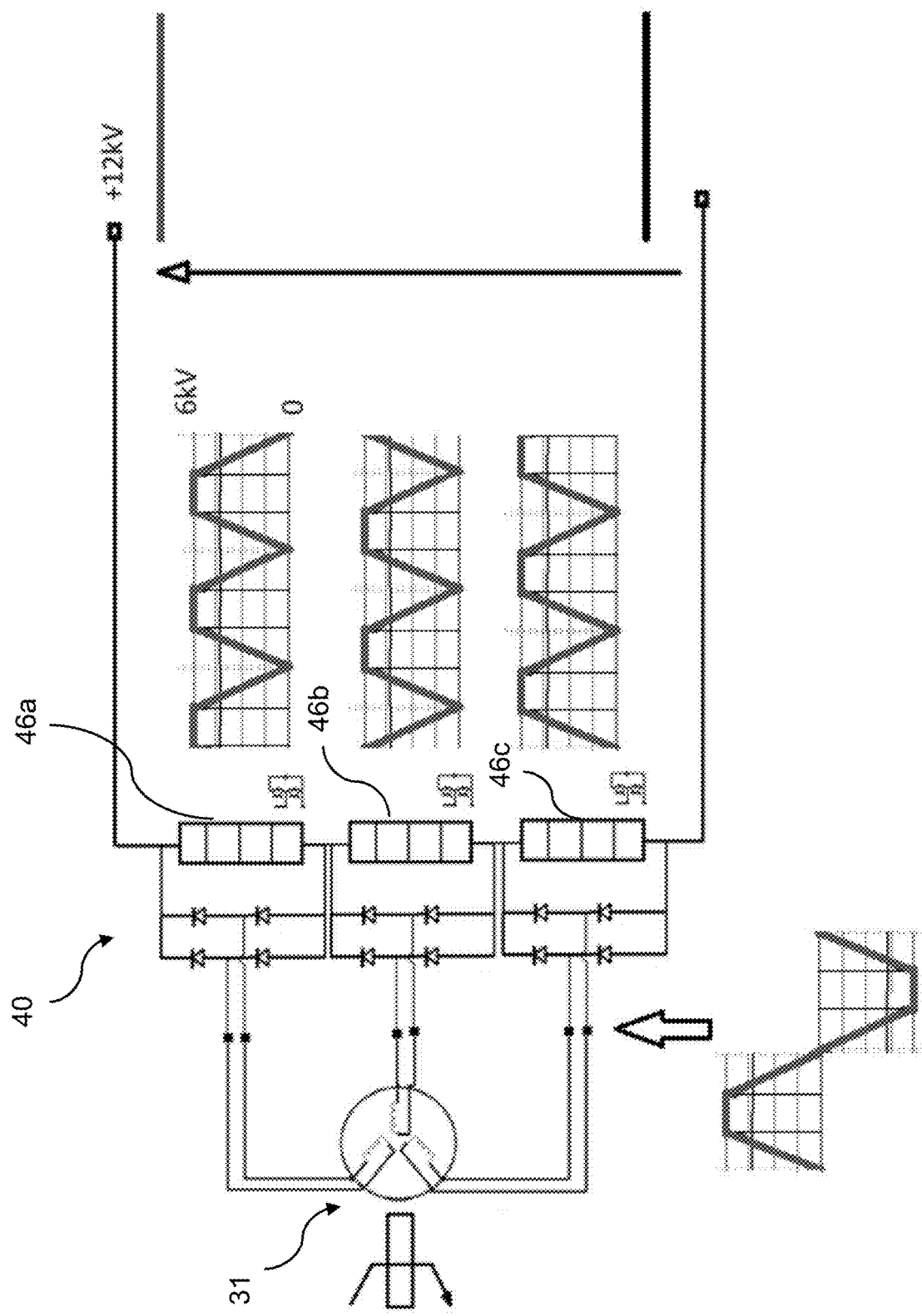
FIG. 18 is an illustration of the DC output current generated by the AC to DC conversion device of the type shown in FIG. 11 when operated with the electrical generator of FIG. 16.

A trapezoidal EMF can be generated through a combination of winding design and magnet pole shaping. FIG. 16 shows an example stator geometry arranged to produce trapezoidal back-EMF output of the type shown in FIG. 17. The stator 31 comprises a plurality of teeth 60. A respective stator coil (B, R, C) is wound around each stator tooth 60 (i.e. to form "concentrated windings"). The stator 31 in this example comprises a cross-sectional geometry of 12 slots and 8 poles as depicted. This is in contrast to a "distributed" winding geometry, in which a coil spans more than one tooth. In a stator having a concentrated winding geometry, a trapezoidal phase EMF (as shown in FIG. 17) is produced to be directly fed into the rectifiers 32*a-c*. Further shaping of these trapezoidal back-EMFs (if required), could be achieved by optimisation of the magnet pole shapes. However, it is worthwhile to note that this type of winding design tends to cause higher losses in the machine (both in the copper winding and iron lamination) due to the higher order harmonics. The higher losses in the machine may be more than compensated for by the elimination or reduction in rating of a DC side harmonic filter. It should also be noted that the system of FIG. 4 could also be used with trapezoidal waveforms, as shown in FIG. 18.

It will be understood that the amount of deviation from the sinusoidal case applied to both the generator 29 and waveform generators 46*a-c* may be different. For example, the designer may wish to provide a generator arranged to produce sinusoidal back EMF waveforms, but choose to apply rectified trapezoidal waveforms at each half-bridge based voltage waveform generator. In such a case, the DC side filtering would be minimised, but given the presence of both trapezoidal and sinusoidal voltages on the AC side, there would be some level of AC harmonic current flow. Such harmonics lead to additional heating and possible torque ripple at the generator shaft. Nevertheless, these levels may be low and acceptable in practice.

Figure 11:
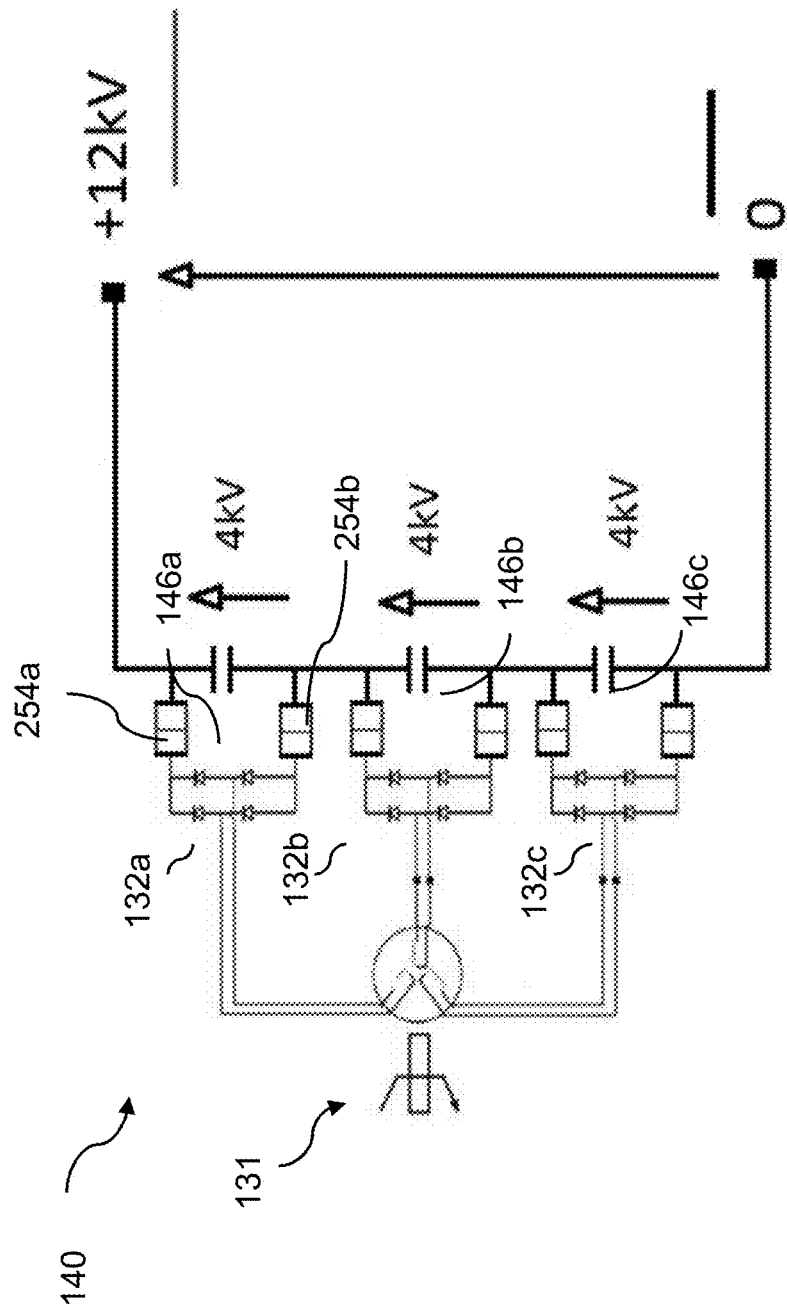
FIG. 11 is an electrical schematic of a second AC to DC conversion device for the propulsion system of FIG. 2.
Figure 12:
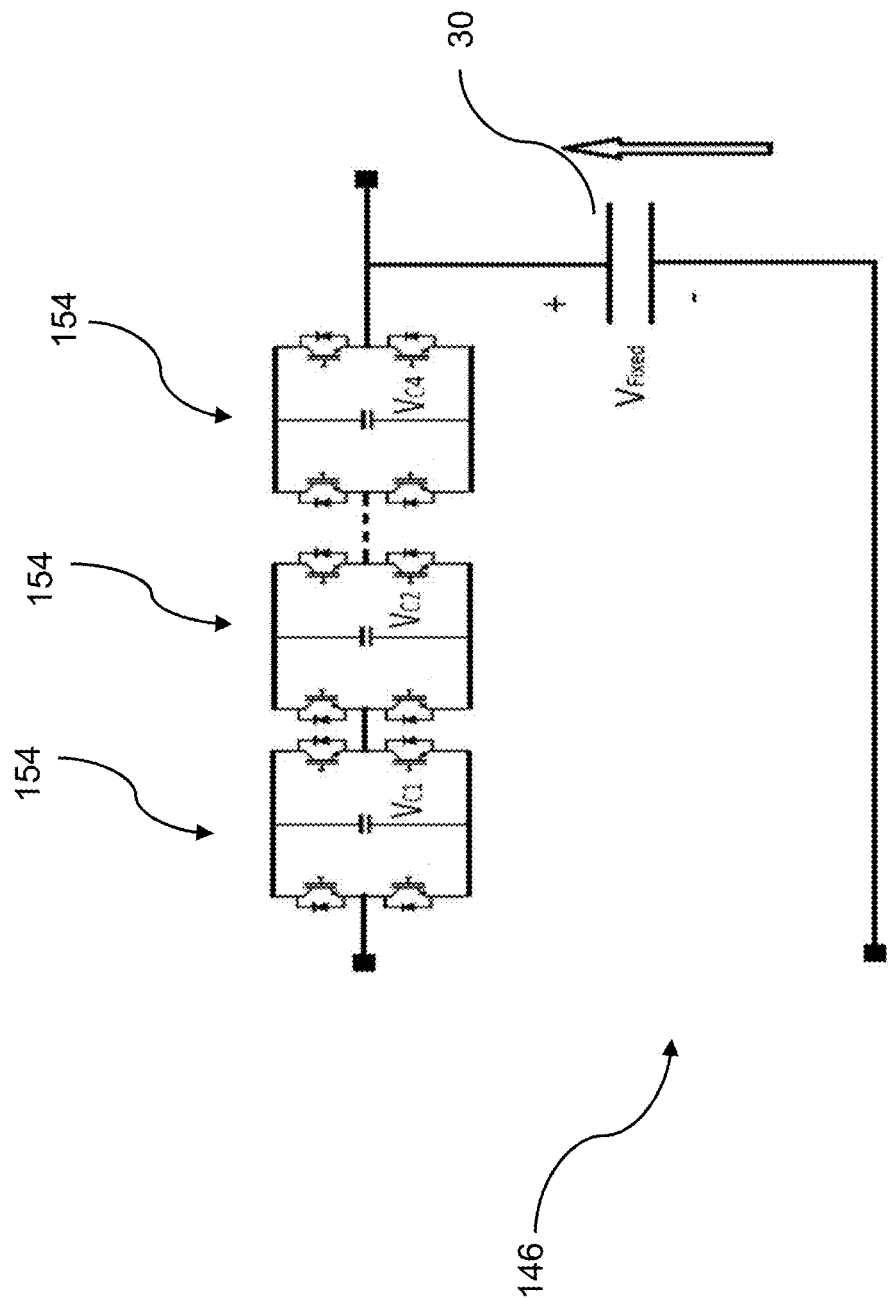
FIG. 12 is an electrical schematic of a waveform generator for the AC to DC conversion device of FIG. 11.

FIGS. 11 and 12 show an alternative arrangement to the converter 40, in the form of a converter 140.

The converter 140 is coupled to a generator 131 in a similar manner to the converter 40, and again comprises a plurality of H-bridge diode rectifiers 132*a-c*, which are similar to the rectifiers 32*a-c*. The converter 140 also comprises a plurality of wave generators 146*a-c*, although these differ from the wave generators 46*a-c* of the first embodiment.

Each waveform generator 146 has the equivalent function of the generators 46*a-c*, however, the generators 146*a-c* are coupled to the remainder of the system in a different way. As shown in FIG. 12, each waveform generator comprises a plurality of sub-modules 154 connected in series to the output of the respective rectifier 132*a-c*, although it will be understood that more or fewer sub-modules may be provided, in accordance with the required number of voltage steps and the required total voltage of the system.

In the embodiment shown in FIG. 11, half of the sub-modules 254*a* (two in this embodiment) are coupled to the anode side of the respective rectifier 132*a-c*, with the other half 254*b* coupled to the cathode/neutral side of the output. It will be understood however that the sub-modules 154 could all be coupled to the anode or cathode side, as is shown in FIG. 12. A fixed DC power source (shown as a capacitor 30 in FIG. 13) is provided across the anode and cathode outputs, of the rectifier, at the outputs of the waveform generator 146*a-c*. the power source may comprise either a dedicated battery or capacitor, or the power storage unit 30.

Figure 13:
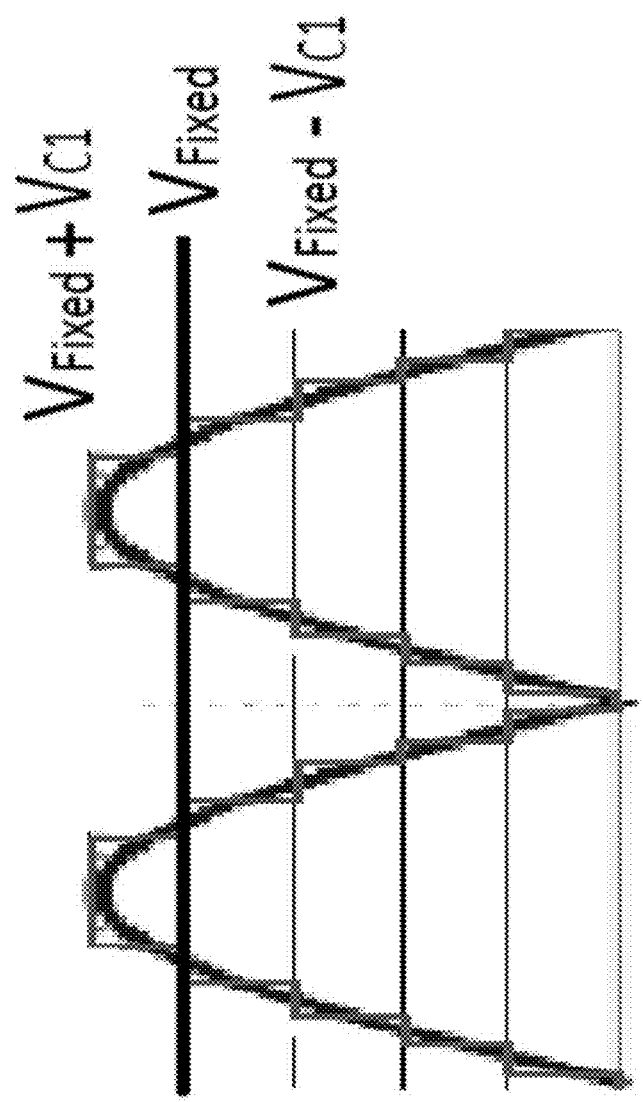
FIG. 13 is a waveform generated by the waveform generator of FIG. 12.

Referring now to FIG. 12, a plurality of sub-modules 154 are provided coupled to the anode of the DC output of a respective inverter 42*a-c*, and to the battery 30. A cathode of the battery is coupled to the cathode output of the output of the respective inverter 42*a-c*. FIG. 13 also shows details of the sub-modules 154.

Each sub-module 154 comprises a full-bridge inverter (though half-bridge inverters could also be used). Each inverter is conventional in construction, comprising a four transistors, and arrangement to switch between high and low voltage outputs to generator a waveform. The waveform output and operation of the system as a whole is similar to that described above for the first embodiment.

An advantage of such an arrangement compared to the first embodiment, is that the output of the converter 140 may have little or no voltage ripple. Consequently, higher quality power can be provided, and the inductor and capacitor provided in the previous embodiment can generally be omitted. By connecting the full-bridge inverters in series with a direct voltage source, any negative voltage can be eliminated, resulting in a uni-directional waveform.

A further advantage of such an arrangement, is that it can be used to respond to a DC network short-circuit fault and prevent the flow of fault current, which is not possible with almost all other types of AC to DC converter.

Figure 14:
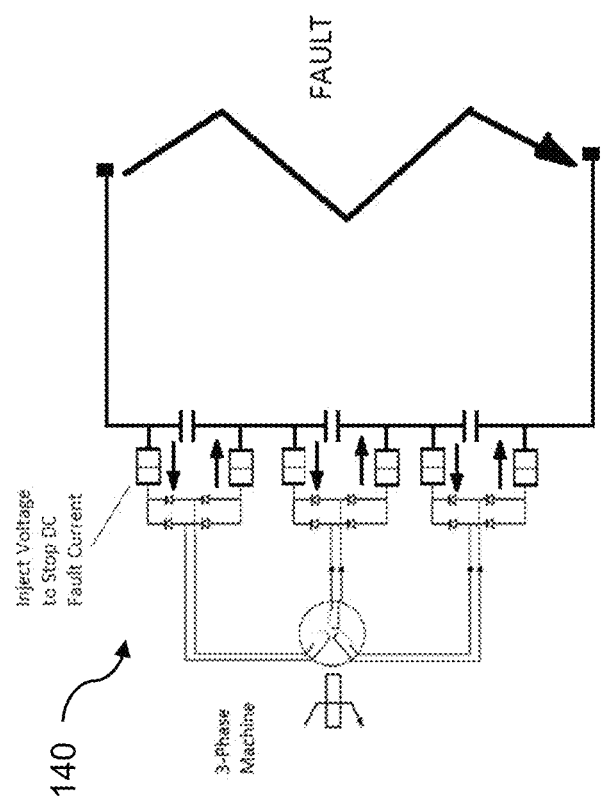
FIG. 14 is a schematic illustrating a faulted AC to DC conversion device of the type shown in FIG. 11.

In this arrangement, the full-bridge sub-modules 154 may be used to inject a voltage to oppose the back EMF of the generator 131, and thus force the DC fault current to zero. Without this injection of voltage from the full-bridge sub-modules, the four diodes which form each main H-bridge are driven into uncontrolled conduction by the generator voltage. FIG. 14 illustrates the DC fault blocking ability of the 3-phase converter shown in FIGS. 11 and 12.

Figure 15:
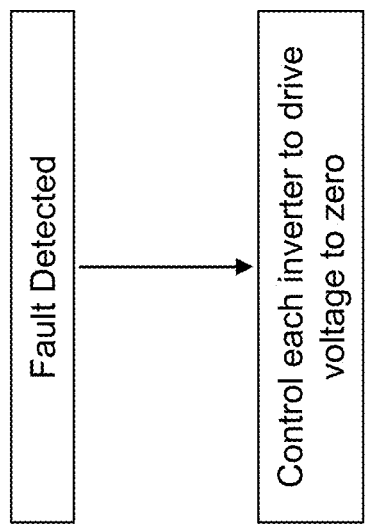
FIG. 15 is a flow diagram illustrating a method of limiting a fault current for the faulted device shown in FIG. 11.

FIG. 15 illustrates a flow diagram for a method of operating the converter 140 in a fault mode. In a first step, a DC short circuit fault is detected. This may for example comprise detecting a current that is greater than a predetermined value in the DC output bus. In a second step, each inverter 142a-c is configured to output a time varying output that is equal to, but opposite the rectified output from a respective rectifier 146a-c. Consequently, the voltage of the DC output bus is driven to zero.

As discussed above, the disclosed system is applicable to generators having substantially any number of phases greater than one. FIGS. 20a and 20b illustrate an embodiment comprising a four-phase generator. Such an arrangement may have several advantages.

Figure 19A:
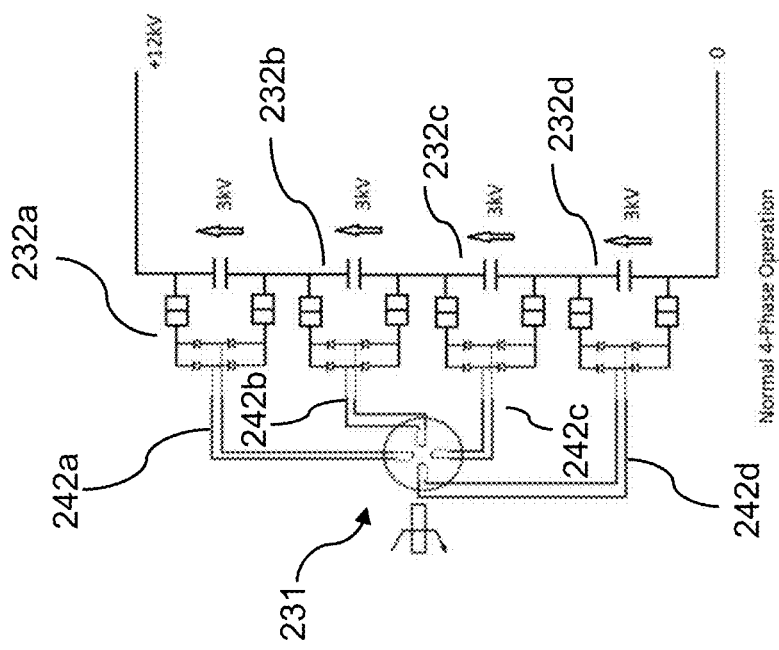
FIGS. 19a and 19b are electrical schematics of an AC to DC conversion device of the type shown in FIG. 12, in conjunction with a four-phase electrical generator in a normal and a fault state respectively.
Figure 19B:
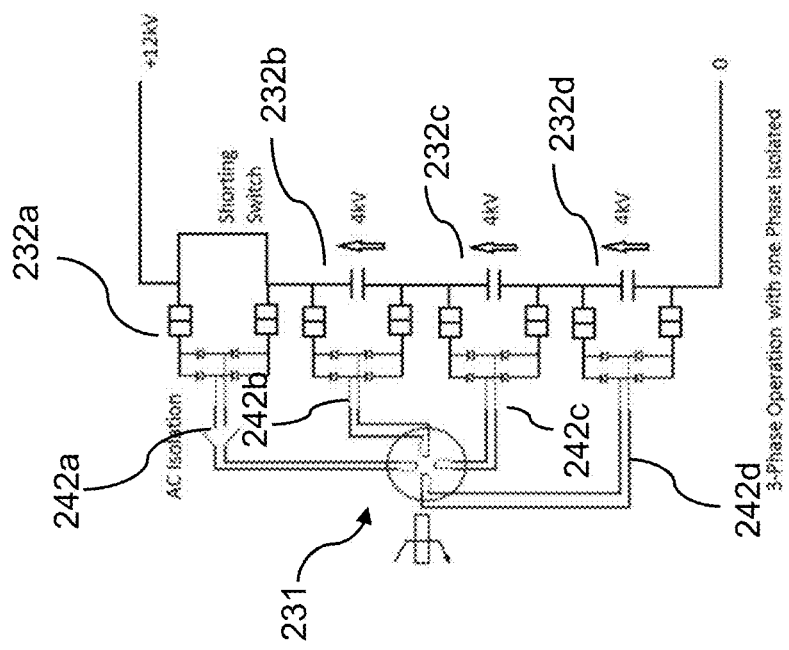

Referring now to FIGS. 19a and 19b, a generator 231 is provided having a four-phase stator 231. Each phase 242a-d is associated with a respective rectifier 232a and waveform generator 246a-d, which is of a similar form to that shown in FIGS. 11 and 12. FIG. 19a shows the arrangement in normal operation, with all four phases generating power to the DC bus. In view of the larger number of phases, each rectifier is normally operated with 3 kV of power, but is rated for higher power, as explained below.

FIG. 19b shows the system operating in a fault mode, with phase 242a isolated. In the event of a fault, a switch on the AC side of the phase 242a is opened, and a shorting switch on the DC side of the respective rectifier 232a is closed. Consequently, the phase 242a is isolated. In such a case, 12 kV DC power can still be provided by operating the remaining rectifiers at 4 kV.

The described arrangement provides a rectifier, generator arrangement and vehicle propulsion system having a number of advantages.

Both the AC side and the DC side of the system are provided with "clean" power, with few unwanted harmonics. This is provided by the active filtering action of the DC side multilevel converter and the summation of three of more phase shifted phases to eliminate low order harmonics at the DC bus. The relative high AC side frequency (e.g. 360 Hz) enables relatively small DC passive filtering (e.g. 2.16 kHz at 6th harmonic) if required.

The system also provides a small size, weight and footprint. The active part of converter (e.g. the three half-bridge or full bridge multilevel converters connected to the three DC phase sides) are of low rating compared to the overall rating of the AC to DC converter. These DC side multilevel converters are not in the main power path and experience low average current. Typically for 100% power transfer, the diode rectifiers (which are passive components) process 80% of the power and the multilevel converters (which are active components) process 20% of the power. The passive diode rectifiers are inherently compact and benefit from double side cooling and not requiring local power supplies, gate control circuits, communication signals etc.

The system defines a low-loss design. For the reasons given above, the low average current in the active converter part of the AC to DC converter will give low conduction and switching losses. Additionally, the diode rectifier will have low losses compared to an active equivalent. Low heat loss means the thermal management/heat-sinking can be minimized again giving benefits in size/weight and footprint.

Furthermore, integration of energy storage into the converter itself is possible. It is also possible to integrate such energy storage without the use of a DC to DC converter at each battery. Consequently, such a system can potentially eliminate a costly, heavy component of a hybrid system.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, in embodiments where the generator is driven by a gas turbine engine, the gas turbine engine may not be directly mechanically coupled to a propulsor. In such a case, the gas turbine engine is mechanically coupled to a generator, which is in turn coupled to one or more electric loads such as an electrically driven propulsor via the AC to DC conversion device, and potentially also a DC to AC conversion device. Such an arrangement is known as a series electric propulsion system.

The invention claimed is:
1. An AC to DC conversion device comprising:
first and second AC input terminals arranged to be coupled respectively to first and second terminals of a phase of an AC current generator;
an H-bridge rectification device comprising two pairs of diodes, each pair being coupled to a respective one of the AC terminals to produce a DC output comprising a rectified back EMF waveform; and
a waveform generator comprising an output coupled to the DC output of the H-bridge rectification device, and configured to input a unidirectional waveform to the DC output, the unidirectional waveform having the same magnitude and fundamental frequency as the rectified back EMF waveform, phase shifted by a predetermined angle δ relative to the rectified back EMF waveform.
2. An AC to DC conversion device according to claim 1, wherein predetermined angle is determined in accordance with a required power in accordance with the equation:

$$P = \frac{EV\sin\delta}{XL}.$$

3. An AC to DC conversion device according to claim 1, wherein power input of the waveform generator is coupled to the DC output of the H-bridge rectification device.

4. An AC to DC conversion device according to claim 1, wherein the waveform generator comprises a half-bridge or full bridge converter coupled between the first and second DC outputs of the H-bridge rectifier.

5. An AC to DC conversion device according to claim 4, wherein the waveform generator comprises a plurality of half-bridge or full-bridge rectifiers connected in series.

6. An AC to DC conversion device according to claim 1, wherein a power input of the waveform generator is coupled to an energy storage device such as a chemical battery, capacitor or fuel cell.

7. An AC to DC conversion device according to claim 4, wherein the energy storage device is coupled across terminals of a capacitor VCn of the half-bridge inverter.

8. An AC to DC conversion device according to claim 6, wherein a DC to DC converter configured to provide a constant input voltage to the waveform generator is provided between the input to the waveform generator and the power storage device, and wherein the DC to DC converter may be coupled across opposite terminals of a capacitor of the half-bridge inverter.

9. An AC to DC conversion device according to claim 1, wherein the waveform generator comprises a half-bridge or full-bridge inverter coupled across either of the positive and negative DC output side of the H-bridge rectification device.

10. An AC to DC conversion device according to claim 9, wherein the conversion device comprises a first inverter coupled across the positive DC output of the H-bridge rectification device, and a second inverter coupled across the negative DC output of the H-bridge rectification device.

11. An AC to DC conversion device according to claim 10, wherein the waveform generator comprises a fixed voltage input coupled between an input of the inverter and the negative or positive DC output of the H-bridge rectification device.

12. An AC to DC conversion device according to claim 10, wherein the waveform generator comprises a plurality of half-bridge or full-bridge inverters coupled in series across the positive or negative DC output of the H-bridge rectification device.

13. An electrical generation system comprising:
an electrical generator comprising a stator comprising one or more stator windings arranged in one or more phases; and
an AC to DC conversion device according to claim 1 coupled to the stator windings of the electrical generator.

14. An electrical generation system according to claim 13, wherein the electrical generator comprises two or more phases which may be configured to operate at $2\pi/n$ radians from one another, where n represents the number of phases.

15. An electrical generation system according to claim 14, wherein first and second terminals of each phase are associated with a respective AC to DC conversion device.

16. An electrical generation system according to claim 13, wherein the electrical generation system comprises an AC to DC conversion device associated with each phase, having DC outputs connected in series.

17. An electrical generation system according to claim 13, wherein the waveform generator is configured to provide a voltage to oppose the back EMF waveform of the DC output of the H-bridge rectification device.

18. An electrical generation system according to claim 13, wherein the electrical generator and waveform generator are each configured to provide a non-sinusoidal waveform such as a trapezoidal waveform.

19. A method of operating an AC to DC conversion device, said AC to DC conversion device comprising:
first and second AC input terminals arranged to be coupled respectively to first and second terminals of a phase of an AC current generator;
an H-bridge rectification device comprising two pairs of diodes, each pair being coupled to a respective one of the AC terminals to produce a DC output comprising a rectified back EMF waveform; and
a waveform generator comprising an output coupled to the DC output of the H-bridge rectification device, and configured to input a unidirectional waveform to the DC output, the unidirectional waveform having the same magnitude and fundamental frequency as the rectified back EMF waveform, phase shifted by a predetermined angle δ relative to the rectified back EMF waveform;
wherein the method comprises providing a unidirectional waveform to the DC output, the unidirectional waveform having the same magnitude and fundamental frequency as the rectified back EMF, phase shifted by a predetermined angle relative to the rectified back EMF waveform.

20. A method according to claim 19, wherein the generator comprises a wound field generator, and the method comprises controlling electrical generator field windings to control generator output AC voltage.

* * * * *